June 15, 1943.  H. BANY  2,321,969
GENERATOR CONTROL SYSTEM
Filed July 11, 1941
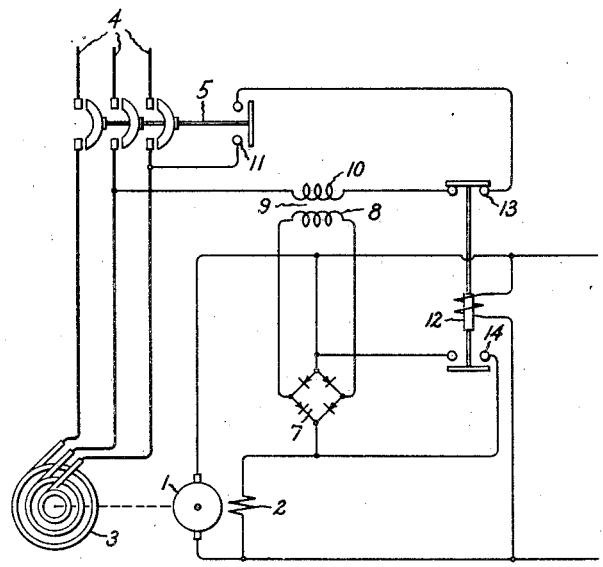
Inventor:
Herman Bany,
by Harry E. Dunham
His Attorney.

UNITED STATES PATENT OFFICE 2,321,969

GENERATOR CONTROL SYSTEM

Herman Bany, Lansdowne, Pa., assignor to General Electric Company, a corporation of New York Application July 11, 1941, Serial No. 401,943

3 Claims. (Cl. 171—312)

My invention relates to generator control systems and particularly to arrangements for causing the voltage of a direct current shunt excited generator to build up quickly to its normal value when the generator is being started from rest, and one object of my invention is to provide an arrangement of apparatus for causing a shunt excited generator to build up its voltage quickly even though the generator has, for any reason, lost its residual magnetism since the last time it was operated.

My invention will be better understood from the following description when taken in connection with the accompanying drawing the single figure of which diagrammatically illustrates a direct current generator shunt field control system embodying my invention, and its scope will be pointed out in the appended claims.

Referring to the drawing, 1 represents a direct current generator which is provided with a shunt field winding 2 and which is arranged to be driven in any suitable manner. In the particular embodiment of my invention shown in the drawing, the generator 1 is arranged to be driven by an alternating current motor 3 which in turn is arranged to be connected to a suitable source of alternating current 4 by means of a switch 5.

In order to cause the voltage of the generator 1 to build up quickly even though the generator has lost its residual magnetism, I provide suitable rectifying means, such as a full wave rectifier 7, which has its input circuit connected to the secondary winding 8 of a potential transformer 9 and its output circuit connected in series with the shunt field winding 2. The primary winding 10 of the potential transformer 9 is arranged to be connected across one phase of the alternating current circuit 4 through the auxiliary contacts 11 on the switch 5 when it is closed. I also provide a control relay 12 which is connected in any suitable manner so that it is responsive to the voltage of the generator 1 exceeding a predetermined value. The relay 12, when in its deenergized position, closes its contacts 13, which are in the energizing circuit of the primary winding 10 of the potential transformer 9. When the voltage of the generator 1 exceeds a predetermined value so that the relay 12 closes its contacts 14, a shunt circuit is then completed across the output circuit of the rectifying means 7 so that it does not have to be of sufficient size to carry the normal exciting current of the exciter 2. Preferably the transformer 9 is so designed that only a small direct current voltage relative to the normal voltage of the generator 1 is impressed across the input circuit of the rectifying means 7.

The operation of the arrangement shown in the drawing is as follows:

When it is desired to start the generator 1, the switch 5 is closed in any suitable manner so that the motor 3 is energized from the supply circuit 4 and causes the generator 1 to be accelerated from rest. The closing of the auxiliary contacts 11 of the switch 5 completes through the contacts 13 of the relay 12 an energizing circuit for the primary winding 10 of the potential transformer 9. Consequently, a voltage is applied to the input circuit of the rectifying means 7 so that a direct current of a sufficient magnitude flows in the proper direction through the field winding 2 and causes the voltage of the generator 1 to build up quickly as the speed of the generator increases. As soon as the generator voltage exceeds a predetermined value, the voltage relay 12 opens its contacts 13 and closes its contacts 14. The opening of the contacts 13 deenergizes the primary circuit of the transformer 9 so as to render the rectifying means 7 ineffective to excite the shunt field winding 2 and the closing of the contacts 14 completes a shunt circuit around the rectifying means 7 in the circuit of the field winding 2.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, an alternating current circuit, an alternating current machine having a direct connected generator, a shunt field winding for said generator, a circuit breaker for connecting said machine to said circuit, rectifying means having an input circuit and an output circuit, said output circuit being connected in series with said field winding so that said field winding is excited in response to the sum of the voltages of said generator and said output circuit, a relay responsive to the voltage of said generator for completing a shunt circuit around said rectifying means when the generator voltage exceeds a predetermined value, and means controlled by said circuit breaker and said relay for energizing said input circuit from said alternating current circuit only when said circuit breaker is closed and the voltage of said generator is below a predetermined value.

2. In combination, an alternating current circuit, an alternating current motor connected to a direct current generator having a shunt field winding, switching means connecting said motor to said circuit, rectifying means having an input circuit and an output circuit, said output circuit being connected in series with said field winding across the terminals of said generator, a relay responsive to the voltage of said generator for completing a shunt circuit around said rectifying means when the generator voltage exceeds a predetermined value, and means controlled by said switching means and said relay for energizing said input circuit from said alternating current circuit only when said motor is connected to said alternating current circuit and the generator voltage is above a predetermined value.

3. In combination, an alternating current circuit, an alternating current machine having a direct connected generator, a shunt field winding for said generator, a circuit breaker for connecting said machine to said circuit, rectifying means having an input circuit and an output circuit, said output circuit being connected in series with said field winding so that said field winding is excited in response to the sum of the voltages of said generator and said output circuit, a relay responsive to the voltage of said generator, and means controlled by said circuit breaker and said relay for energizing said input circuit from said alternating current circuit only when said circuit breaker is closed and the voltage of said generator is below a predetermined value.

HERMAN BANY.